No. 702,596. Patented June 17, 1902.
G. F. RYAN.
PIPE CONNECTION.
(Application filed Sept. 27, 1901.)
(No Model.) 2 Sheets—Sheet 1.

Witnesses:
Carl S. Crawford
Gertrude Bryce

Inventor:
George F. Ryan
by Poole & Brown
his Attorneys

UNITED STATES PATENT OFFICE.

GEORGE F. RYAN, OF CHICAGO, ILLINOIS.

PIPE CONNECTION.

SPECIFICATION forming part of Letters Patent No. 702,596, dated June 17, 1902.

Application filed September 27, 1901. Serial No. 76,719. (No model.)

*To all whom it may concern:*

Be it known that I, GEORGE F. RYAN, of Chicago, in the county of Cook and State of Illinois, have invented certain new and useful Improvements in Pipe Connections; and I do hereby declare that the following is a full, clear, and exact description thereof, reference being had to the accompanying drawings, and to the letters of reference marked thereon, which form a part of this specification.

This invention relates to a pipe-joint intended for connecting a non-metallic pipe, such as earthenware sewer-pipe, to a metallic fitting or pipe in such manner as to secure a strong and tight joint between the joined parts.

The invention consists in the matters hereinafter described, and pointed out in the appended claims.

Figure 1:
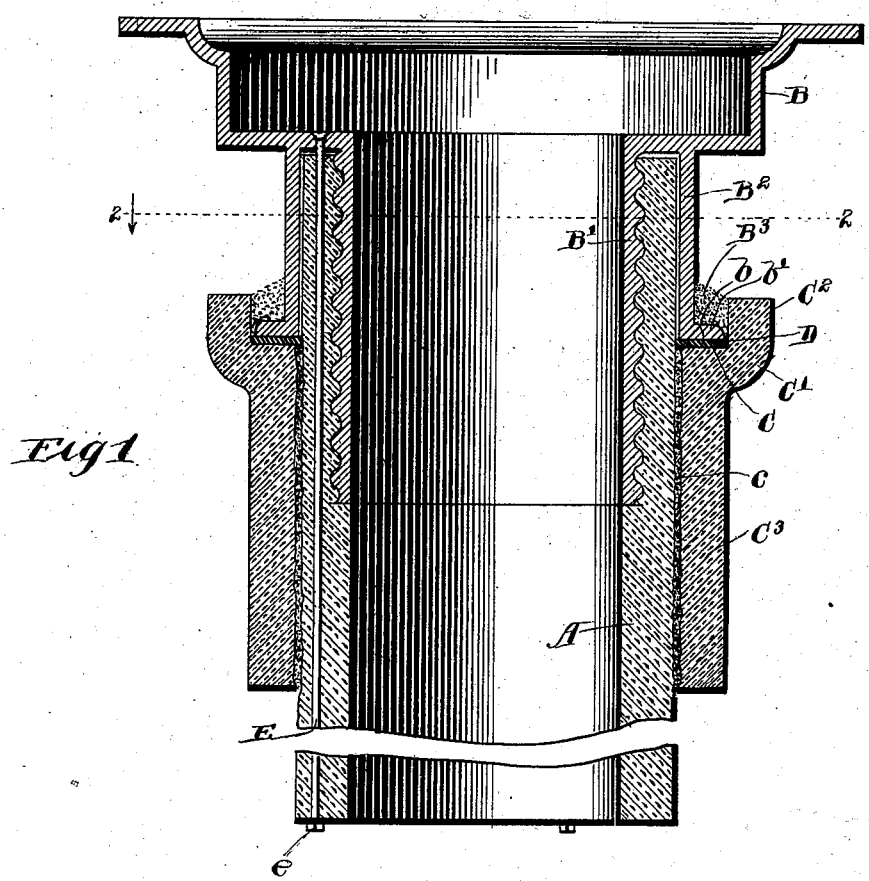
Figure 2:
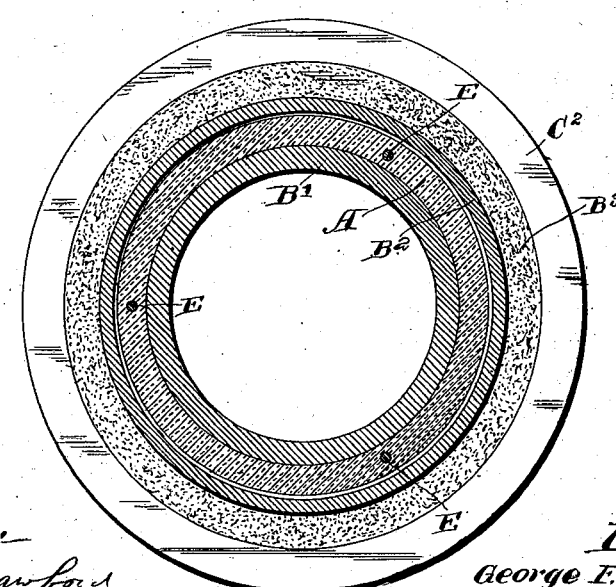
Figure 3:
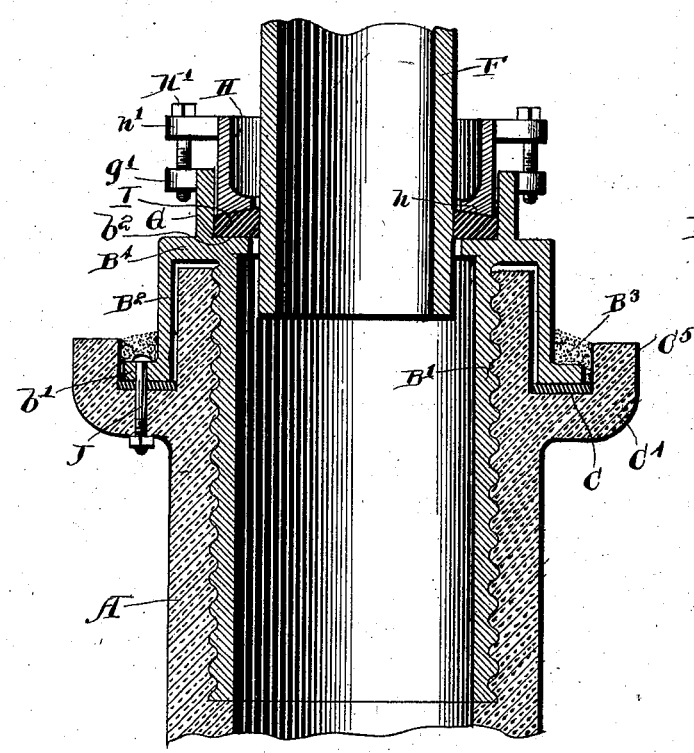
Figure 4:
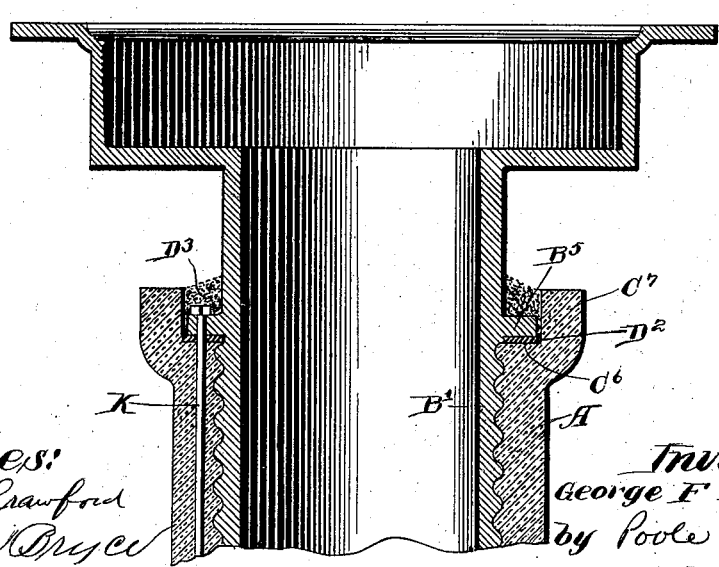

In the accompanying drawings, Figure 1 is a view in longitudinal section of a length or section of earthenware sewer-pipe and a metal fitting, such as is placed in the floor of an area or in like location to receive surface water. Fig. 2 is a plan section of the same, taken on line 2 2 of Fig. 1. Fig. 3 is a view, in longitudinal section showing a somewhat-different form of connection employed in connection with a slip-joint between a non-metallic and a metal pipe. Fig. 4 is a longitudinal section illustrating a modification of the construction shown in Figs. 1 and 2.

Referring to the construction illustrated in Figs. 1 and 2 of said drawings, A indicates a length or section of earthenware pipe, and B a metal part or fitting attached to the same, the fitting shown in Figs. 1 and 2 and in Fig. 4 being such as is placed in a floor or pavement to receive drainage therefrom and being secured to the upper end of the pipe A, which in the instance illustrated is the upper end of a sewer-pipe. The fitting B is provided with an integral tubular projection or sleeve B', which is screw-threaded on its outer surface and engages interior screw-threads formed on the pipe-section A. The said screw-threads will preferably be formed in molding or shaping the pipe and will be made large or coarse and of rounded form or with concave and convex surfaces and without angles, this form of screw-thread being employed to facilitate the molding of the pipe and because a rounded thread is less liable to injury in burning the pipe than would a small and angular thread. On the exterior of the pipe A is formed an annular shoulder C, which faces toward the end of the pipe to which the fitting B is attached. Connected with the fitting B is an exterior sleeve B², which surrounds or embraces the end portion of the pipe A and is provided on its end margin with an annular bearing-face $b$, which when the parts are assembled opposes the annular shoulder C. Between the said shoulder C and the annular bearing-surface $b$ is placed a packing ring or gasket D. The screw-threaded connection between the earthenware pipe and the sleeve B' is not designed to afford a tight joint between the parts and will usually not be especially tight-fitting, because of the slight irregularities necessarily resulting from the molding and burning of the pipe; but such screw-threaded joint will be used to hold the parts from endwise movement, while the gasket D will be relied upon to afford the necessary air or water tight joint between the parts. Manifestly the exterior sleeve B² will be forced toward the shoulder C, so as to compress the gasket D, by turning the inner sleeve within the pipe.

The exterior sleeve B² is not fitted tightly to the exterior surface of the pipe A, but is made somewhat larger in interior diameter than the said pipe, so as to leave clearance or space to provide for irregularities in the external surface of said pipe. The shoulder C is also located on the pipe C² at such distance from the outer end of the sleeve B² that when the gasket D is clamped between the end surface of the said sleeve and shoulder a space will be left in the end of the pipe A and the bottom wall of the fitting B, which joins the sleeves B' and B², thereby affording space or clearance to enable the gasket to be tightly clamped between the said sleeve B² and the shoulder C, notwithstanding irregularity in the end of the pipe.

To prevent the sleeve B' and parts attached thereto from being turned backwardly or unscrewed from the pipe A by accident or carelessness on the part of workmen, I have shown in Figs. 1 and 2 bolts E inserted through the casing B and extending endwise through the wall of the pipe A, said bolts, as herein shown, being three in number and having heads fitting countersunk holes in the said fitting B and having nuts $e$ at their lower ends which bear against the end of the pipe and by which they are tightly held in place. Holes will be formed in the wall of the pipe for receiving the bolts E during the operation of molding the pipe, the holes being easily formed by thrusting a rod endwise through the soft clay after the pipe is molded. The bolts E will preferably be made of brass or copper rather than iron, which is likely to be destroyed by rust. Said rods E are not intended to be relied upon as a means of holding the fitting and parts connected therewith in position with respect to the pipe A, but the engagement of said sleeve B' with the pipe is mainly relied upon for this purpose, the screw-threaded connection of the sleeve with the pipe, together with the engagement of the sleeve $B^2$ with the exterior shoulder C, serving to form a strong and rigid attachment of the fitting to the pipe, such as is required in the case of house-drains, by reason of the fact that the fitting B is usually exposed to the surface of the ground or pavement and is liable to be subjected to the impact or pressure of heavy articles or weights. The shoulder C is shown as formed by means of a radial flange C', which projects from the surface of the pipe A and is provided with a cylindric extension $C^2$, which cylindric flange forms an annular groove or bell, in which the end of the sleeve $B^2$ is seated. Said sleeve $B^2$ is, moreover, preferably provided with a radial flange $b'$, on which is formed the annular bearing-surface $b$ and which affords the necessary bearing-surface for contact with the said gasket D. After the parts have been connected the bell formed by said cylindric flange $C^2$ affords a groove or space surrounding the flange $b'$, within which after the parts have been assembled a filling $B^3$ of cement may be inserted to protect the gasket, and as an additional means of maintaining a tight joint at the point where the sleeve $B^2$ meets the shoulder C of the earthenware pipe. As a further and separate improvement I form the shoulder C and the bell surrounding the same on an earthenware sleeve $C^3$, which is made separate from and fitted around the pipe A and is secured thereto by cement or like material placed between the parts. The layer of cement which serves to secure the sleeve $C^3$ to the pipe A is indicated by $c$. The portion of the exterior surface of the pipe A surrounded by the sleeve $C^3$, as well as the interior surface of said sleeve, may be roughened or slightly corrugated, if found desirable or necessary, in order that the cement may adhere more strongly to the surfaces between which it is placed.

An important advantage gained by forming the shoulder C upon a separate sleeve $C^3$ is that such sleeve may be adjusted in position upon the pipe, when it is secured thereto by the cement, so as to bring the shoulder exactly in desired position with relation to the end of the pipe, according to the length of the sleeve $B^2$, the thickness of the gasket D, and other conditions which may prevail in any particular case.

In Fig. 3 I have shown a construction wherein the connection between a metal fitting $B^4$ and an earthenware pipe A is afforded by a sleeve B' like that hereinbefore described, the said fitting in this instance, however, being employed to afford a sliding or slip joint between an iron sewer-pipe F, such as may be used in a building, and the earthenware pipe. In this instance the shoulder C is formed on a radial flange $C^4$, made integral with the pipe A, said flange $C^4$ being provided with a cylindric flange $C^5$, forming a bell to receive a filling $B^3$ of cement in the same manner as hereinbefore described. The slip-joint between the pipe F and the fitting is like that illustrated in my prior application, Serial No. 46,176, filed February 6, 1901, the same embracing a ring G, which forms an extension of the fitting $B^4$, a second ring H, which fits within the ring G, and a packing ring or gasket I, said gasket I being located between a shoulder $b^2$ on the fitting and an oblique shoulder $h$ on the inner end of the ring H, said oblique shoulder $h$ serving when the ring is forced inwardly to press the gasket toward the pipe F, and thus form a tight joint adapted to permit the said pipe to slide or move under expansion or in case of settlement of the building in which the pipe is placed. To provide for forcing the ring H inwardly toward the shoulder $b^2$, the rings G and H are provided with radial lugs $g'$ $h'$, through which are inserted bolts H', which serve to adjustably secure said rings to each other and by means of which the ring H may be drawn into the ring G and the gasket tightened against the pipe F in the manner described. In said Fig. 3 I have shown a bolt J as inserted through the flange $b'$ on the sleeve $B^2$ and also through the radial flange $C^4$, said bolt serving the same purpose as the bolt E, hereinbefore described—that is to say, to prevent the sleeve $B^2$ being turned in the pipe A in such manner as to loosen the joint afforded by the packing or gasket.

In Fig. 4 I have shown a further modification of the pipe connection embodying the general features hereinbefore set forth. In this instance the sleeve B' and earthenware pipe A are provided with screw-threaded engaging surfaces in the same manner as hereinbefore described. Said sleeve B' in this instance, however, is provided with an exterior radial flange $B^5$, and the pipe A has upon its end an outwardly-facing annular shoulder $C^6$, between which and the flange $B^5$ is located a packing or gasket $D^2$. In this instance, also, the pipe A is provided at its ends with a cylindric flange $C^7$, which forms an annular groove or bell in which said flange rests and which may be filled with a cement filling $D^3$. To hold the sleeve B' from turning in the earthenware pipe A, one or more bolts K, like those hereinbefore described, may be inserted through the flange B⁵ and endwise through the wall of the pipe.

In all of the several forms of joints illustrated the screw-threaded connection between the interior metal sleeve and the exterior earthenware pipe affords a strong and rigid connection between the parts calculated to withstand any strain to which the joint may be subjected, the gasket applied between the shoulder on the pipe and the flange on the said sleeve between the earthenware pipe and metal sleeve being, however, relied upon to maintain the necessary air-tight connection between the parts.

If desired, the metal sleeve B' may be further secured to the earthenware pipe by inserting cement between the screw-threaded surfaces of these parts at the time the screw-threaded sleeve is inserted in the earthenware pipe. The cement in such case may be introduced in semifluid form and will harden after the parts have been brought to the proper position. The use of a cement in the joint between the metal sleeve and earthenware pipe cannot, however, be relied upon to always maintain an air-tight joint, because of the liability of the cement to crack or loosen in case the fitting is subjected to heavy shocks or strains, and the use of a gasket is therefore necessary to insure such an air-tight joint. In case cement is introduced between the sleeve and pipe it will, however, serve to prevent relative movement of the parts, such as might occur if no cement were used, and the presence of such cement will therefore be of advantage, at least in all cases where the metal sleeve fits loosely in the pipe.

I claim as my invention—

1. The combination of an earthenware pipe provided with interior screw-threads, a metal fitting provided with a sleeve having exterior screw-threads, said earthenware pipe having an annular shoulder and the fitting being provided with an annular bearing-face which opposes the shoulder when the sleeve is inserted in said pipe, and a packing ring or gasket located between said shoulder and the said annular bearing-face of the fitting, and a bolt connecting said fitting with the earthenware pipe to prevent the turning of the said sleeve in the pipe.

2. The combination of an earthenware pipe provided with interior screw-threads of large size and rounded form, a metal fitting provided with a sleeve provided with exterior screw-threads corresponding with those of the pipe, said pipe being provided with an annular shoulder and the fitting having an annular bearing-face which opposes the said shoulder when the sleeve is inserted in the pipe, and an annular packing or gasket located between said shoulder and said annular bearing-face.

3. The combination of an earthenware pipe provided with interior screw-threads, a metal fitting provided with a sleeve having exterior screw-threads, said pipe having an annular shoulder and a flange exterior thereto forming a bell, and the fitting being provided with a radial flange which forms a bearing-surface opposing the said shoulder, a gasket between said shoulder and annular bearing-surface, and a filling of cement or the like applied in the said bell over the said flange.

4. The combination of an earthenware pipe provided with interior screw-threads, a metal fitting provided with a sleeve having exterior screw-threads, said pipe having an exterior annular shoulder, and the fitting having an exterior sleeve which embraces the end of the pipe and which is provided with an annular bearing-surface, and a gasket interposed between said shoulder and annular bearing-surface.

5. The combination of an earthenware pipe provided with interior screw-threads, a metal fitting provided with exterior screw-threads, said pipe having an exterior flange forming an annular shoulder and the fitting having an exterior sleeve which embraces the end of the pipe and which is provided with a radial flange on which is formed an annular bearing-surface opposing said shoulder on the pipe, a gasket interposed between said annular shoulder and bearing-surface, and a filling of cement or the like applied within said bell over said radial flange.

6. The combination of an earthenware pipe and an exterior separate earthenware sleeve having a shoulder and with a flange exterior thereto forming a bell, said sleeve being secured in place on the pipe by cement.

7. The combination with an earthenware pipe, a separate earthenware sleeve surrounding the pipe and provided with a shoulder and with a flange exterior thereto forming a bell, a fitting provided with an interior sleeve which enters the pipe and with an exterior sleeve which embraces the end of the said pipe, said exterior sleeve having an annular bearing-surface opposing the shoulder on said exterior earthenware sleeve, and a gasket interposed between said shoulder and the annular bearing-surface on said exterior sleeve of the fitting.

8. The combination of an earthenware pipe provided with interior screw-threads, a fitting provided with a sleeve having exterior screw-threads, and a bolt engaging said fitting and passing endwise through the wall of said pipe.

9. The combination of an earthenware pipe provided with interior screw-threads, an earthenware sleeve surrounding said pipe and provided with an annular shoulder and a flange exterior thereto forming a bell, a fitting provided with an interior sleeve having exterior screw-threads and with an exterior sleeve which embraces the end of the pipe and has at its end a radial flange, a gasket interposed between said flange and the annular shoulder on the earthenware sleeve, and a filling of cement applied in said bell over the said radial flange on the exterior sleeve of the fitting.

10. The combination of an earthenware pipe provided with interior screw-threads, an earthenware sleeve surrounding said pipe and provided with an annular shoulder, a fitting provided with an interior sleeve having exterior screw-threads and with an exterior sleeve which surrounds the end of the pipe and is provided with an annular bearing-surface, a gasket interposed between said shoulder and annular bearing-surface, and a bolt engaging the said fitting and passing endwise through the wall of the said pipe.

In testimony that I claim the foregoing as my invention I affix my signature, in presence of two witnesses, this 24th day of September, A. D. 1901.

GEORGE F. RYAN.

Witnesses:
C. CLARENCE POOLE,
GERTRUDE BRYCE.